US009955107B2

(12) United States Patent
Wang et al.

(10) Patent No.: US 9,955,107 B2
(45) Date of Patent: Apr. 24, 2018

(54) DIGITAL VIDEO RECORDER RECORDING AND RENDERING PROGRAMS FORMED FROM SPLICED SEGMENTS

(75) Inventors: Yeqing Wang, Horsham, PA (US); Christopher S. Del Sordo, Souderton, PA (US); Ernest G. Schmitt, Maple Glen, PA (US)

(73) Assignee: ARRIS Enterprises LLC, Suwanee, GA (US)

( * ) Notice: Subject to any disclaimer, the term of this patent is extended or adjusted under 35 U.S.C. 154(b) by 995 days.

(21) Appl. No.: 12/428,625

(22) Filed: Apr. 23, 2009

(65) Prior Publication Data
US 2010/0272419 A1 Oct. 28, 2010

(51) Int. Cl.
*H04N 5/85* (2006.01)
*H04N 21/2365* (2011.01)
(Continued)

(52) U.S. Cl.
CPC ............. *H04N 5/76* (2013.01); *G11B 27/105* (2013.01); *G11B 27/322* (2013.01); *H04N 5/783* (2013.01); *H04N 7/10* (2013.01); *H04N 21/23424* (2013.01); *H04N 21/4334* (2013.01); *H04N 21/44016* (2013.01); *H04N 21/812* (2013.01); *H04N 21/8456* (2013.01); *H04N 5/765* (2013.01); *H04N 5/775* (2013.01); *H04N 5/781* (2013.01); *H04N 5/85* (2013.01);
(Continued)

(58) Field of Classification Search
CPC ................ G11B 27/105; G11B 27/322; G11B 21/23424; G11B 21/4334; G11B 21/44016; G11B 21/812; G11B 21/8456; G11B 5/76

USPC ............ 386/248, 291, E5.001, E5.043; 348/423.1, 500, 515, 700; 360/72.1, 132; 375/240.28, E7.022, E7.023, E7.183, 375/E7.192, E7.271, E7.278, 240.26, 375/E7.004, E7.129; 725/44; 370/389; 385/52

See application file for complete search history.

(56) References Cited

U.S. PATENT DOCUMENTS 5,903,407 A * 5/1999 Tsai ................ G09B 5/065
360/132
6,181,383 B1 * 1/2001 Fox ............... H04N 21/23424
348/423.1

(Continued)

OTHER PUBLICATIONS

PCT Search Report & Written Opinion, Re: Application #PCT/US2010/030796; dated Jul. 22, 2010.
(Continued)

*Primary Examiner* — Thai Tran
*Assistant Examiner* — Syed Hasan
(74) *Attorney, Agent, or Firm* — Stewart M. Wiener

(57) ABSTRACT

A method and apparatus is provided for recording a program. The method includes storing, in response to a user request, at least one content file that includes first and second program segments that are spliced to form a single program. At least one index file is created and stored. The file index includes program specific information associated with the first and second program segments. The index file also includes an identification of a splice point denoting a transition between the first and second program segments. In addition, a splice index is created and stored. The splice index includes timing information specifying a time at which the splice point occurs.

20 Claims, 4 Drawing Sheets

(51) Int. Cl.
*H04N 21/2368* (2011.01)
*G11B 27/10* (2006.01)
*H04N 5/76* (2006.01)
*H04N 7/10* (2006.01)
*G11B 27/32* (2006.01)
*H04N 5/783* (2006.01)
*H04N 21/234* (2011.01)
*H04N 21/433* (2011.01)
*H04N 21/44* (2011.01)
*H04N 21/81* (2011.01)
*H04N 21/845* (2011.01)
*H04N 9/475* (2006.01)
*H04N 5/765* (2006.01)
*H04N 5/775* (2006.01)
*H04N 5/781* (2006.01)
*H04N 9/804* (2006.01)
*H04N 9/82* (2006.01)

(52) U.S. Cl.
CPC ........... *H04N 9/475* (2013.01); *H04N 9/8042* (2013.01); *H04N 9/8205* (2013.01); *H04N 9/8227* (2013.01)

(56) References Cited

U.S. PATENT DOCUMENTS

| | | | |
|---|---|---|---|
| 6,907,081 B2* | 6/2005 | Mantchala | H04N 21/23412 348/700 |
| 2001/0013123 A1 | 8/2001 | Freeman et al. | |
| 2002/0154694 A1 | 10/2002 | Birch | |
| 2002/0196850 A1 | 12/2002 | Liu et al. | |
| 2004/0218093 A1 | 11/2004 | Radha et al. | |
| 2005/0094965 A1 | 5/2005 | Chen et al. | |
| 2005/0281328 A1 | 12/2005 | Hurst, Jr. et al. | |
| 2006/0075449 A1 | 4/2006 | Jagadeesan et al. | |
| 2007/0140358 A1 | 6/2007 | Schwartz et al. | |
| 2008/0092168 A1* | 4/2008 | Logan | G06F 17/30265 725/44 |
| 2008/0285556 A1* | 11/2008 | Park | H03M 13/1515 370/389 |

OTHER PUBLICATIONS

"StationRipper: The Advanced Internet Radio Recorder V2.30-V2.33—Change Log"; (Online) Jun. 22, 2008; XP002588836; URL:http://web.archive.org/web/20080622152414/http://www.stationripper.com/version/pages/V2.33_ChangeLog.htm.

"Cue Sheet from Hydrogenaudio Knowledgebase"; (Online) Aug. 22, 2008; XP002588837; URL://http://web.archive.org.web/20080822101630/http://wiki.hydrogenaudio.org.index.php?title=Cuesheet.

"Foobar2000 Software"; (Online) Oct. 29, 2007; URL:http://web.archive.org/web/20071029221004/http://www.foobar2000.org/index.html.

"StationRipper Software"; (Online) Aug. 22, 2008; URL:http//web.archive.org/web/20080822030331/http://www.stationripper.com/.

"Streamripper Software"; (Online) Mar. 25, 2008; URL:http://web.archive.org.web/20080325100111/http://streamripper.sourceforge.net/.

Society of Motion Picture and Television Engineers (SMPTE), "Proposed SMPTE Standard for Television—Splice Points for MPEG-2 Transport Streams", SMPTE 312M, SMPTE Journal, vol. 107, No. 10, Oct. 1998, pp. 916-925.

Society of Cable Telecommunication Engineers (SCTE), "Digital Program Insertion Cueing Message for Cable", SCTE Engineering Committee, Digital Video Subcommittee, American National Standard ANSI/SCTE 35 2007.

International Telecommunication Union, ITU-T Recommendation H.222.0 (02/00), Telecommunication Standardization Sector of ITU, "Series H: Audiovisual and Multimedia Systems—Infrastructure of Audiovisual Services—Transmission Multiplexing and Synchronization: Information Technology—Generic Coding of Moving Pictures and Associated Audio Information: Systems", Feb. 2000.

Office Action issued to Canadian Application No. 2,758,267 dated May 21, 2014.

Office Action issued to Chinese Application No. 201080018203.3 (Foreign text and English Translation) dated Nov. 5, 2013.

Official Action RE: Chinese Application No. 201080018203.3 (Foreign text and English Translation), dated Feb. 16, 2015.

Official Action, RE: Canadian Patent Application No. 2,758,267, dated Jul. 13, 2016.

* cited by examiner

DIGITAL VIDEO RECORDER RECORDING AND RENDERING PROGRAMS FORMED FROM SPLICED SEGMENTS

FIELD OF THE INVENTION

The present invention relates generally to recording devices such as a digital video recorder and more specifically to a method and apparatus in which content that is spliced from two or more segments is to be rendered as a single program.

BACKGROUND OF THE INVENTION

As is well known, advertising forms an important part of programming that is broadcast or otherwise delivered to viewers. The revenues generated from advertisers subsidize and in some cases pay entirely for the programming. Even in subscriber-based television systems such as cable and satellite television systems, the revenues from advertisements subsidize the cost of the programming, and were it not for advertisements, the monthly subscription rates in such systems could be many times higher than at present. In the past, analog video ads were commonly inserted into analog satellite video feeds by the local cable operators. Most often, analog ads were stored on tape and switched into the network feed by analog video switches, with the switching process being triggered by a cue tone sequence on the associated audio feeds delivered together with the video feed and received by a satellite receiver. As more cable systems have been converted to deliver digitally compressed video to the customer's home, cable operators have developed a variety of new technologies for inserting digital advertising content into the digital bitstream.

In the digital realm, video programs are typically encoded into MPEG video streams that are then multiplexed into a Multi-Program Transport Stream (MPTS). The process of concatenating digitally encoded video segments such as a program and an advertisement is referred to as splicing. Splicing is generally accomplished by defining "in-points" and "out-points" for each video stream, which are indicative of appropriate stream entry and exit points, respectively. The Society of Cable Television Engineers Standard 35 (SCTE 35) is one example of a cable protocol that supports Digital Program Insertion (DPI) in MPEG-2 streams by defining digital cue tone signals that are inserted in the digital video stream at the headend during the network encoding process. These cue tone messages exist as specific data packets with specific header information. Common cue tone signals include a pre-roll signal, which is sent approximately 5 to 8 seconds before splice time to indicate an upcoming available advertisement time slot (frequently referred to as an "avail"); a start signal, which marks the beginning of the avail and is used to trigger switching from the original video stream into the ad stream; and a stop signal, which occurs at the end of the avail for switching back to the original video stream.

In the context of advertising, splicing is sometimes used to deliver targeted ads to viewers. Traditional broadcast television systems broadcast the same television signal to each person viewing a particular station. Thus, each person viewing a particular channel will necessarily view the same programming content as well as the same advertisements embedded in the programming content. However, with modern digital television systems more personalized television service is possible. For instance, a group of subscriber households can be selectively addressed through a cable node serving that group. Similarly, individual subscriber households can be selectively addressed though their set top terminals. In other words, the service provider can send different data to different subscribers or groups of subscribers. As result, different viewers receiving the same program may be presented with different advertisements. This can be accomplished at the time the advertisement is to be presented by forcing the viewer's terminal (e.g., a set top terminal) to transition from one service to another service. In one example, the transition may be accomplished by forcing the viewer terminal to tune from one physical or logical channel on which a program is being received to another physical or logical channel on which an advertisement targeted to that viewer is being received. Once the advertisement has been received the viewer terminal will transition back to the service that is delivering the original program. Alternatively, instead of using different services, both the program and the advertisement may be sent in a common transport packet stream on a single channel. The common transport packet stream will include the individual program transport streams for both the program and the advertisement.

Concurrent with the increase in growth of digital cable systems has been the increasing popularity in the use of Digital Video Recorders (DVRs) by viewers. DVRs store program material onto a storage medium that is easily accessible and reusable, and the recording does not degrade over time as with video tapes. DVRs may be implemented as stand alone devices that are interconnected to other devices. Alternatively, they may be implemented as a subsystem of a set top terminal, media center or television. In this case the DVR can control the channel tuned on the television, provide an interactive electronic program guide, and record programming on a manual or timer controlled basis. Additionally, the DVR can buffer incoming audiovisual programming to enable a viewer to pause or replay a portion of a live television program, so long as the pause or replay does not exceed the capacity of the buffer. In addition to the standard play mode (forward direction, standard speed), DVRs are capable of displaying video in several "trick play" modes. Trick play modes include fast forward play, slow forward play, fast reverse play, slow reverse play, and pause.

When programming content that includes a splice point is recorded and subsequently rendered by a DVR, the DVR will need to identify the splice point defining the transition point between the original program and the advertisement, or, more generally, between any two segments of content that have been spliced together. When the splice point is reached the decoder in the DVR will need to stop rendering the first content segment and then begin rendering the second content segment. This can be problematic in some cases, particularly when the user renders the program using trick play modes, since in many trick play modes of operation (e.g., fast-forward) not all the frames of a program are decoded and presented for viewing, and hence not all the packets associated with the program will be decoded. Moreover, since in other trick play modes of operation (e.g., rewind at the normal presentation rate) the frames of a program are not decoded and presented for viewing in their normal sequential order, the packets associated with those frames are not decoded in their normal sequential order. In either case the data packets identifying the splice points may not be decoded at the appropriate time, thus preventing the DVR from properly transitioning between the different content segments.

SUMMARY

In accordance with the present invention, a method and apparatus is provided for recording a program. The method includes storing, in response to a user request, at least one content file that includes first and second program segments that are spliced to form a single program. At least one index file is created and stored. The file index includes program specific information associated with the first and second program segments. The index file also includes an identification of a splice point denoting a transition between the first and second program segments. In addition, a splice index is created and stored. The splice index includes timing information specifying a time at which the splice point occurs.

In accordance with another aspect of the invention a set top terminal is provided. The set top terminal includes a receiver/tuner for receiving programs over a broadband network and a DVR module for coordinating storage and playback of programs received over the broadband network. The DVR module is configured to store in at least one content file first and second program segments associated with a single program received over the broadband network. The DVR module is also configured to store in at least one index file program specific information associated with the first and second program segments. In addition, the DVR module is further configured to store in a common splice index file timing information denoting a splice point between the first and second program segments. The set top terminal also includes at least one storage medium for storing the content file, index file and the splice index file. A processor is operationally associated with the receiver/tuner, the storage medium and the DVR module.

BRIEF DESCRIPTION OF THE DRAWINGS

FIG. 7 is a flowchart showing one example of a method for rendering a program that has been recorded on a DVR system or the like.

DETAILED DESCRIPTION

As described herein, a single program may include two or more program segments. In some cases one of the program segments may contain the primary content that is of interest to the viewer while a second segment may contain a commercial or other interstitial. For instance, if the primary content is a nationally distributed program, the interstitial may be a locally produced segment that is directed to a geographically limited group of subscribers. Likewise, the second segment may be a commercial that is targeted to a limited number of viewers. In this way viewers may be presented with the same primary content but different commercials. In yet other examples, instead of an interstitial, the second segment may be, for instance, an alternative ending to the primary content that is included in the first program segment. Regardless of the nature of the two program segments, each segment is generally delivered by a different service over a broadband network.

As detailed below, a DVR system is provided that can record and store a program that is made up of multiple program segments provided by different services. The different segments will generally be stored by the DVR system in a common file, although in some cases they may be stored in different files as well. The program can be subsequently rendered as a single program even in trick play modes such as rewind and fast forward.

It should be understood by those skilled in the art that, although the system is described as being implemented in connection with a DVR subsystem of a set-top terminal, the invention also may be implemented for use in a stand alone DVR device that is network enabled. In some cases the video rendering device may be located at the headend of a broadband network so that it can supply programming to multiple viewers over the broadband network. The video rendering device also may be implemented as a stand-alone portable device or it may be incorporated in other devices, both portable and non-portable, such as a television, personal computer, PDA, and the like.

Figure 1:
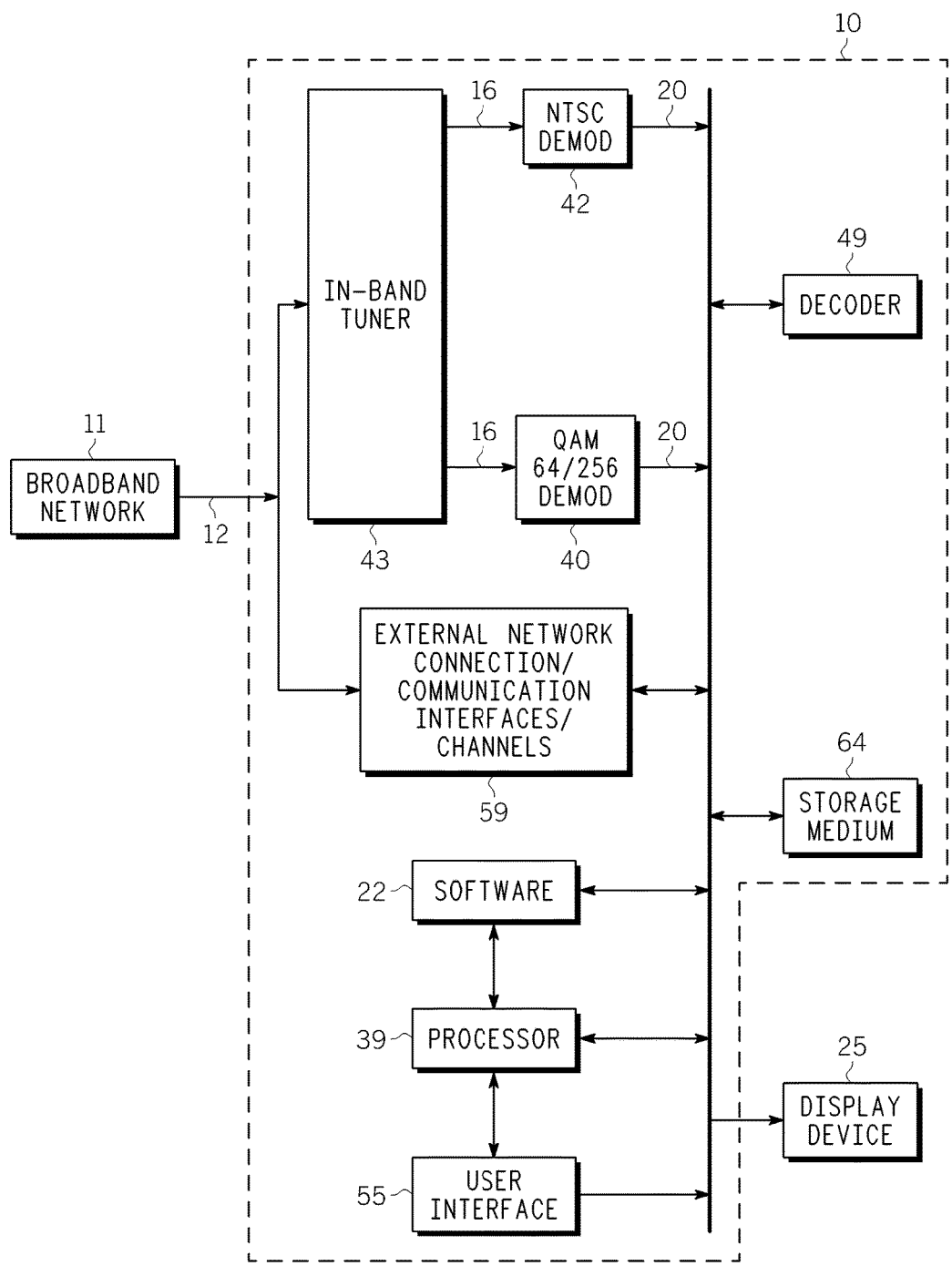
FIG. 1 is a block diagram of one example of a DVR system 10.

Turning now to the drawings, where like numerals designate like components, FIG. 1 is a block diagram of one example of a DVR system 10 ("system 10"). System 10 receives video signals 12 in which programming content is embodied over a broadband network 11. In one particular example, DVR system 10 is a DVR-enabled cable set-top terminal, broadband network 11 is a hybrid fiber-optic/coax cable network operated by a cable television operator, and video signal 12 is a multi-channel analog and/or digital programming source broadcast by the cable operator. DVR system 10, however, may be any device or combination of devices capable of receiving, recording and playing back video signal 12; broadband network 11 may be any public or private, wired or wireless, video transmission infrastructure or technology, including but not limited to a fiber-optic network, a coaxial cable network, a hybrid network, a satellite network, cellular network, the Internet, a television network, a radio network, a copper wire network, or any other existing or future transmission infrastructure or technology, operated by any type of program provider, such as a television network or station, a studio, an Internet broadcaster or service provider, a cable operator, or a satellite operator; and video signal 12 may be any pre-recorded or live analog or digital electronic signal representing an image, audio and/or data, in any format.

DVR system 10 includes external network connection/communication interfaces 59, which support devices such as modems, streaming media players and other network connection support devices and/or software, coupled through local or wide area broadband networks (not shown) to program providers and providers of other content, such as advertising content. DVR system 10 further includes an in-band tuner 43, which tunes to a channel signal 16 selected by a viewer via user interface 55. User interface 55 may be any type of known or future device or technology allowing the consumer to select channels or programs the consumer wishes to receive, such as a remote control, mouse, microphone, keyboard, or touch-screen display associated with a digital video recorder.

Channel signal 16 includes video and/or audio components Demodulators 40 and 42 are responsive to in-band tuner 43. Demodulator 40, which may be a 64/256 quadrature amplitude modulation demodulator, for example, is responsive to receive a digital version of channel signal 16. Demodulator 40 identifies digital data packets from one or more digital sources, such as a Moving Pictures Experts' Group (MPEG) transport stream, a high-definition television stream, or a media stream from an external network connection 59, such as a cable modem, using well-known methods and techniques. Demodulator 42, which may be an NTSC demodulator, for example, is responsive to receive an analog version of channel signal 16 and to decode signals and markers according to well-known methods and techniques. Demodulators 40 and 42 are operative to output video information 20.

Video information 20 includes raw video or audio data, arranged for formatting in accordance with a predetermined media format. Video information 20 is preferably arranged in accordance with an MPEG media format, such as the MPEG-2 media format, but may be arranged in accordance with other media formats, including but not limited to other MPEG formats, Hypertext Markup Language (HTML), Virtual Hypertext Markup Language (VHTML), Extensible markup language (XML), H.261, H.263 or H.264 formats. The video information 20 generally composes a single program transport stream. The single program transport stream includes the various program elementary streams 520 such as video, audio and data elementary streams. The single program transport stream also includes program specific information associated with the elementary streams 520 such as system tables, which in the case of MPEG, for example, includes the Program Map Table (PMT). The PMT describes the elementary streams 520 (e.g., video, audio and data streams) that compose the program being recorded. The PMT specifies the packet identifiers (PIDs) for each elementary stream 520. For instance, a video program will generally include a video and audio PID as well as certain other PIDs such as a Program Clock reference (PCR) PID and an Entitlement Control Message (ECM) PID.

Storage medium 64 is responsive to receive, among other things, encoded video signal 20 for storage. Storage medium 64 may be any local or remote device, now known or later developed, capable of recording data, including but not limited to a hard disk drive, a videocassette recorder tape, all types of optical storage media such as compact disks and digital videodisks, a magnetic tape, a home router, or a server.

Decoder 49 is responsive to receive recorded encoded video signal 20 from storage medium 64, and to play back recorded encoded video signal 20 via display device 25, in response to instructions from user interface 55. Decoder 49 is also responsive to receive and pass through video programming directly from tuner 43. Internal arrangements of decoder 49 are well known—decoder 49 may include analog-to-digital converters, one or more storage media and/or buffers, and general or special-purpose processors or application-specific integrated circuits, along with demultiplexors for demultiplexing and/or synchronizing at least two transport streams, for example, video and audio. Video and audio decoders and/or analog and digital decoders may be separate, with communication between separate decoders allowing for synchronization, error correction and control.

Display device 25, which also includes speakers for outputting audio signals, displays video programming received from tuner 43 or storage medium 64. Display device 25 is responsive to receive analog or digital signals, including but not limited to S-video, composite audio-video, SPDIF, and DVI.

Processor 39 and software 22 are illustrated functionally, and are responsive to various elements of DVR system 10, including demodulators 40 and 42, storage medium 64 and decoder 49. When loaded into a processor, such as processor 39, software 22 is operative to control encoding, recording and playback of encoded video signal 20. It will be appreciated, however, that aspects of the DVR system are not limited to any specific embodiments of computer software or signal processing methods. For example, one or more processors packaged together or with other elements of DVR system 10 may implement functions of processor 39 in a variety of ways. It will also be appreciated that software 22 may be any stored instructions, in one or more parts (stored, for example, on storage medium 64, or another internal or external storage medium such as a read-only-memory or a random-access memory) electronically controlling functions provided by DVR system 10, including firmware, and may be used or implemented by one or more elements, including one or more processors, of DVR system 10.

In one particular example, the DVR system 10 may be implemented as a DVR application module that is part of a software stack that resides over a hardware architecture. The software and hardware environment may be proprietary, or alternatively, it may be compliant with any of a variety of different platform standards such as the OpenCable Application Platform (OCAP), MHEG, DASE, and the Multimedia Home Platform (MHP). Other application modules that may be included in the software stack may be designed to receive a variety of different services in addition to conventional broadcasting services such as video on demand and switched digital video, for example.

During normal operation of the DVR system 10, a viewer using user interface 55 selects a particular program to be recorded from broadband network 11 and/or selects a recorded program for playback from storage medium 64. When a program is to be recorded, the program transport stream 20 associated with the selected program is transferred to storage medium 64. Likewise, when a program is to be played back, a program transport stream 20 associated with the selected program is transferred from storage medium 64 to decoder 49 for processing. Decoder 49 demultiplexes and decodes the program transport stream 20 for presentation to the consumer via display device 25.

It should be noted that the DVR system as described above is a device associated with an individual subscriber which receives content from a headend over a broadband network. However, in yet another implementation the DVR subsystem may be a network DVR that is located at the headend of the broadband network. The network DVR can store content that can be transmitted to a set top terminal via a hub and access network in response to a user request to play a program stored on the network DVR. Other user input requests associated with a conventional DVR can also serviced by a network DVR, including, for example, trick play modes of operation.

In some trick play modes of operation, DVR system 10 can, via user interface 55, rewind or fast-forward a program being played back. For instance, a user interface such as a remote control may have dedicated keys or buttons that rewind or fast-forward through the currently playing program. In rewind mode, the program may be presented at the normal presentation rate or at one or more frame rates that are higher than the normal presentation frame rate. For instance, the rewind button on the remote control of a conventional DVR is often preprogrammed to rewind through a program at 1, 4, 16, or 30 times the normal frame rate, depending on how many times the rewind button is depressed.

As previously mentioned, since in many trick play modes of operation (e.g., fast-forward) not all the frames of a program are decoded and presented for viewing, not all the packets associated with the program will be decoded. Moreover, since in other trick play modes of operation (e.g., rewind at the normal presentation rate) the frames of a program are not decoded and presented for viewing in their normal sequential order, the packets associated with those frames are likewise not decoded in their normal sequential order.

Figure 2:
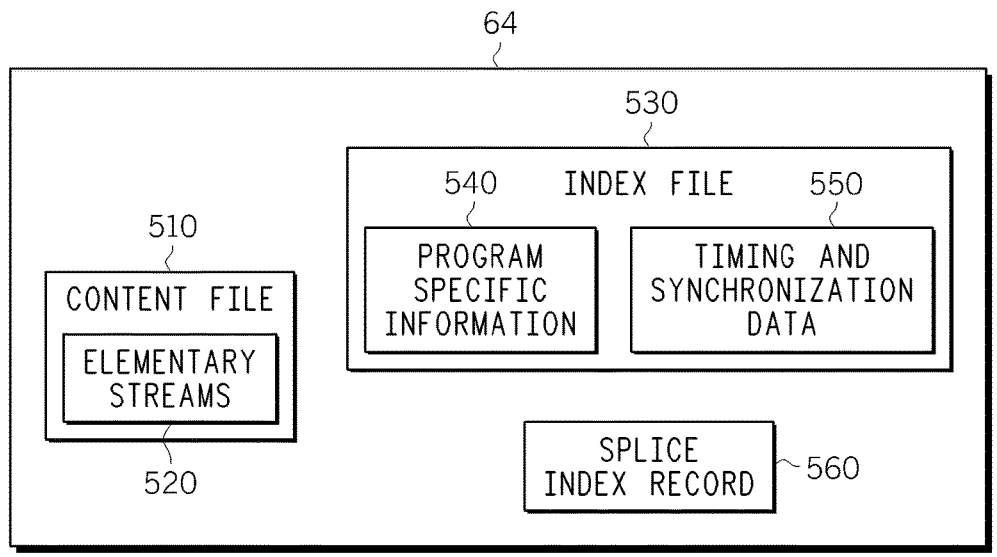
FIG. 2 shows one example of the files that are generated when a DVR system records a program.

When the DVR system 10 records a program a number of different files are generated. In particular, as shown in FIG. 2 a content file 510 is generated, which may be stored on a storage medium associated with the DVR system such as storage medium 64 in FIG. 1. The content file 510 stores the various elementary streams 520 (e.g., video, audio, data) that are included with the single program transport stream associated with a service. In addition, an index file 530 is generated.

The index file 530 is created when a DVR recording is made. The index values stored in the index file 530 are generated while recording the program. These values are received by the DVR system and stored in the index file. The index file 530 also includes timing information that allows trick play operations (e.g., fast-forward, rewind) to be performed during playback. The index file 530 is used to derive program timing information, which allows the user to know how far into the program he/she has proceeded.

The index file 530 stores in a record 540 the program specific information associated with the elementary streams 520 such as MPEG system tables. Such information includes the program's service number, which is used to access MPEG system tables such as the program map table (PMT). As previously mentioned, the PMT describes the elementary streams 520 (e.g., video, audio and data streams) that compose the program being recorded. The PMT specifies the packet identifiers (PIDs) for each elementary stream. For instance, a video program will generally include a video and audio PID as well as certain other PIDs such as a PCR PID and an ECM PID.

The index file 530 also includes another record 550 in which timing and synchronization data is located, which is generated by the DVR system 10 as the program is being recorded. The timing data, which in the simplest case may be a running count of the recorded frames or some other time-based program number, is used during playback and trick play modes of operation such as fast-forward and rewind. The timing and synchronization record 550 may also identify splice points that arise in the programs. Such splice points may be identified in a variety of different ways. For instance, in the context of MPEG-2, the Society of Motion Pictures and Television ("Proposed SMPTE Standard for Television—Splice Points for MPEG-2 Transport Streams") has suggested a new extension to the MPEG-2 specifications to facilitate splicing by incorporation of splice points and related splicing-support information directly into the data stream at the time of encoding. These or any other techniques may be employed to incorporate splice point identifiers into a program transport stream, which may be used to identify and locate transitions that arise when two different program and program segments are to be presented as a single program. For instance, other techniques that may be used to identify splice points include the industry standards defined in ISO/IEC 13818-1 and ANSI/SCTE 35.

As previously mentioned, in some cases a viewer may record a single program that is divided into two or more segments that are delivered over the broadband network in different transport streams that are associated with different services. For instance, the first program segment may be received in a first transport stream and the second program segment such as an interstitial that is targeted to the particular viewer may be received in a second transport stream. When the first program segment is recorded a content file and its associated index file (e.g. content file 510 and index file 530 in FIG. 2) are created. The second program segment may be recorded in the same content file as the first program segment and the program specific information associated with the second program segment may be stored in the same index file as the program specific information associated with the first program segment. Alternatively, in some cases when the second program segment is recorded a second content file and a second index file may be created. In either case, the presentation of such a program after it has been recorded is discussed in connection with FIG. 3.

Figure 3:
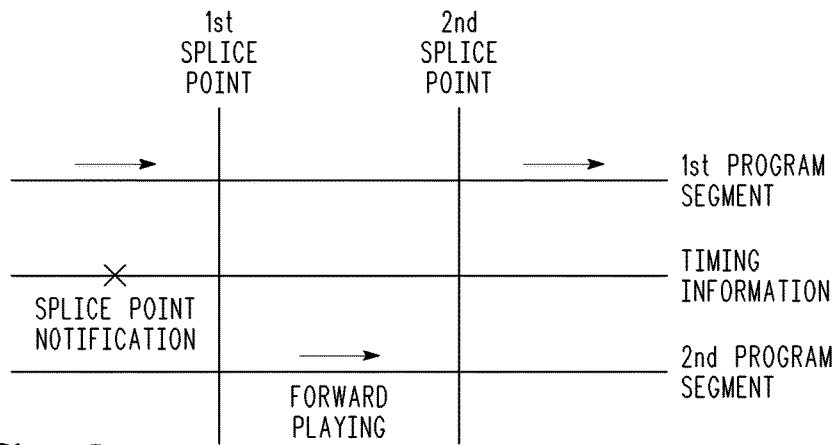
FIG. 3 shows the presentation paths of a program that is being rendered from a DVR system in a normal mode of operation.

FIG. 3 shows the presentation paths of a program that is being rendered from the DVR system in a normal mode of playback. The uppermost horizontal line represents the presentation of the first program segment, which, as indicated by the arrows, is proceeding from left to right (i.e., time increases to the right). The first program segment is stored in a first content file such as content file 510 shown in FIG. 2. The second or middle horizontal line represents timing information, which may be stored in the timing and synchronization record 550 shown in FIG. 2, which is associated with the first content file. In this case the timing information includes a data packet indicating that a splice point is about to be reached, at which time the DVR system is to begin rendering an interstitial (e.g., a commercial) that has been received in a second transport stream and which may be stored in the first content file. In this case the interstitial is to replace a corresponding portion of the first program segment. The presentation of the interstitial is represented by the third or lowermost horizontal line in FIG. 3. As indicated by the arrow directly above the interstitial, the DVR system begins rendering the interstitial when the decoder in the DVR decodes the data packet indicating that a splice point has been reached. At some later time, as specified in the splice point identifier included with the data packet that has already been decoded, the DVR system once again renders the first program segment when a second splice point is reached.

As FIG. 3 demonstrates, the presentation of a program that is divided over two or more transport streams is satisfactory in a normal mode of playback. A problem arises, however, if the program is rendered in reverse, such as occurs in a rewind mode of operation. This problem will be illustrated in connection with FIG. 4.

Figure 4:
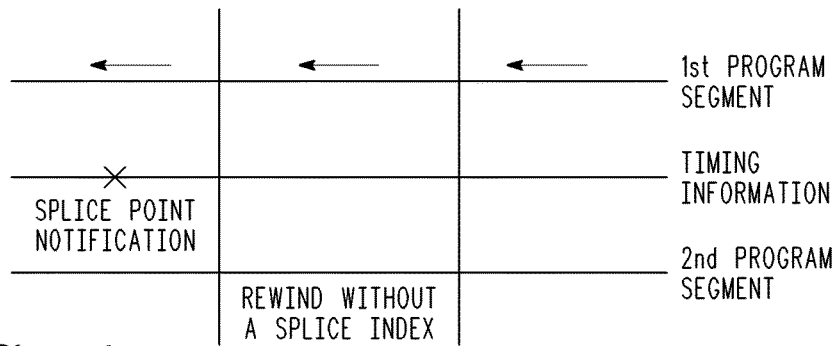
FIG. 4 shows the presentation paths of the same program segments shown in FIG. 3 when rendered in a fast forward mode of operation.

FIG. 4 represents the presentation paths of the same program segments and the same timing information shown in FIG. 3. As the arrows indicate, however, in FIG. 4 the first program segment is being rendered in a rewind mode. In contrast to FIG. 3, when the first program segment is being rewound the data packet identifying the splice point (available from the timing and synchronization record in the first index file) is not reached until after both splice points have been passed. As a result, the DVR system never renders the interstitial but rather simply continues rendering the first program segment for the entire duration of time that is illustrated. That is, the programming presented to the viewer in a rewind mode is different from the programming that is presented to the viewer in a normal mode of play.

A similar problem arises when a viewer renders the program segments using other trick play modes such as fast-forward. In the case of fast-forward, not all the frames of a program are decoded and presented for viewing, and hence not all the packets associated with the program will be decoded. If the data packet or packets identifying the splice points are not decoded, the DVR will not transition from the first to the second program segment.

To overcome this problem associated with trick play modes of operation, the DVR system creates a new splice index record 560, which in FIG. 2 is shown as being located in its own index file. Of course, more generally, the splice index record 560, as well as the other tables and records discussed herein, may be formatted and stored in any appropriate manner and in any appropriate location. For instance, in some cases the splice index record 560 may be included in the content file itself. The DVR system populates the splice index record 560 with various information that is used to ensure a seamless playback of the recorded program in any operating mode (e.g., normal play, fast forward, rewind) through the transition or demarcation point at which the splice occurred. In particular, the splice index includes timing information that defines the splice point between the program segments.

The information stored in the splice index record 560 may also include a timing offset that is used to create sequential index values before and after the splice point. Since the timing number that will be generated and stored in the currently open index file will be reset to zero after the splice point, the DVR system can add the offset to each timing number as the timing number increments after the splice point. The timing offset may be simply equal to the last value of the timing index that was generated prior to the splice point. For example, if the splice occurs at a timing number of 15 during the first program segment, the value of the timing offset could be simply 15. In this way, when the timing number resets to zero after switching to the interstitial, the initial timing index value that will be stored in the splice index will be equal to 0+15, the second timing number will be equal to 1+15, and so on.

The information provided in the splice index record 560 may also include information obtained from the index files for both the first program segment and the interstitial. Such information may include, for instance, the service number and the video, audio and PCR PIDS of the two program transport streams. In this way the DVR processor will not need to access the individual index files for the two program segments when transitioning across the splice point. One example of the data that may be included in the splice index record 560 is shown in Table 1.

The illustrative data shown in Table 1 includes the PIDs for the transport stream prior to the splice point transition, which are referred to as the Pre-Service Acquisition (Pre-Serv Acq) PIDs, as well as the PIDs for the transport stream subsequent to the splice point transition, which are referred to as Post-Service Acquisition (Post-Serv Acq) PIDs. Accordingly, Table 1 sets forth various well-known PIDs such as the video, audio and Program Clock Reference (PCR) PIDs, as well as the MPEG service number prior and subsequent to the splice point transition.

TABLE 1

| Item | Data Name | Data Description |
|---|---|---|
| 1 | Pre-Serv Acq Video PID | This video PID needs to be saved for use when we Rewind (REW) through the Service Acquisition (Serv Acq) transition. A check needs to be done to determine if the Pre-Serv Acq Video PID is different than the Post-Serv Acq Video PID. Only if it is different should the Hardware (HW) be set up accordingly. |
| 2 | Post-Serv Acq Video PID | This video PID needs to be saved for use when we perform normal playback and Fast-Forward (FF) through the Serv Acq transition. A check needs to be done to determine if the Pre-Serv Acq Video PID is different than the Post-Serv Acq Video PID. Only if it is different should the HW be set up accordingly. |
| 3 | Pre-Serv Acq Audio PID | The audio PID prior to the Serv Acq needs to be saved for use when we REW through the Serv Acq transition. A check needs to be done to determine if the Pre-Serv Acq Audio PID is different than the Post-Serv Acq Audio PID. Only if it is different should the HW be set up accordingly. |
| 4 | Post-Serv Acq Audio PID | This Audio PID needs to be saved for use when we perform normal playback and FF through the Serv Acq transition. A check needs to be done to determine if the Pre-Serv Acq Audio PID is different than the Post-Serv Acq Audio PID. Only if it is different should the HW be set up accordingly. |
| 5 | Pre-Serv Acq PCR PID | The PCR PID prior to the Serv Acq needs to be saved for use when we REW through the Serv Acq transition. A check needs to be done to determine if the Pre-Serv Acq PCR PID is different than the Post-Serv Acq Program Clock Reference (PCR) PID. Only if it is different should the HW be set up accordingly. |
| 6 | Post-Serv Acq PCR PID | This PCR PID needs to be saved for use when we perform normal playback and FF through the Serv Acq transition. A check needs to be done to determine if the Pre-Serv Acq PCR PID is different than the Post-Serv Acq PCR PID. Only if it is different should the HW be set up accordingly. |
| 7 | Pre-Serv Acq Data PID | The Data PID prior to the Serv Acq needs to be saved for use when we REW through the Serv Acq transition.. A check needs to be done to determine if the Pre-Serv Data PID is different than the Post-Serv Acq Data PID. Only if it is different should the HW be set up accordingly. |

TABLE 1-continued

| Item | Data Name | Data Description |
|---|---|---|
| 8 | Post-Serv Acq Data PID | This Data PID needs to be saved for use when we perform normal playback and FF through the Serv Acq transition. A check needs to be done to determine if the Pre-Serv Acq Data PID is different than the Post-Serv Acq Data PID. Only if it is different should the HW be set up accordingly. |
| 9 | Pre-Serv Acq ECM PID | The Entitlement Control Message (ECM) PID prior to the Serv Acq needs to be saved for use when we REW through the Serv Acq transition. A check needs to be done to determine if the Pre-Serv Acq ECM PID is different than the Post-Serv Acq ECM PID. Only if it is different should the HW be set up accordingly. |
| 10 | Post- Serv Acq ECM PID | This ECM PID needs to be saved for use when we perform normal playback and FF through the Serv Acq transition. A check needs to be done to determine if the Pre-Serv Acq ECM PID is different than the Post-Serv Acq ECM PID. Only if it is different should the HW be set up accordingly. |
| 12 | Pre-Serv Acq MPEG Service Number | The MPEG Service number of the program prior to the Serv Acq transition needs to be saved. This is needed when we perform REW operations across the Serv Acq transition. The platform software uses this to carry out necessary Service Information processing. |
| 13 | Post-Serv Acq MPEG Service Number | The MPEG Service number of the program prior to the Serv Acq transition needs to be saved. This is needed when we perform normal playback operations and FF operations across the Serv Acq transition. The platform software uses this to carry out necessary Service Information processing. |

The platform software associated with the DVR system monitors the index file during trick play mode operation and senses the point in the content where the transition must take place. The information in the splice index file is used to recreate that transition. If the trick mode is in the forward direction then the Post-Service Acquisition (Post-Serv Acq) PID information shown in Table 1 is used to acquire the service. If the trick mode is in the reverse direction, then the Pre-Service Acquisition (Pre-Serv Acq) PID information shown in Table 1 is used to acquire the service.

Figure 5:
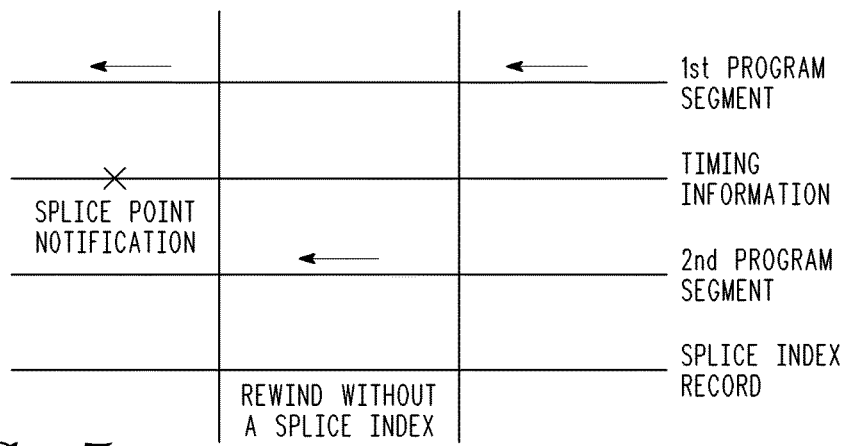
FIG. 5 shows the presentation paths of the same program shown in FIGS. 3 and 4 when rendered in a rewind mode of operation along with one example of a splice index record in accordance with one example of the present invention.

FIG. 5 represents the presentation paths of the same primary and interstitial programs shown in FIGS. 3 and 4, along with the splice index record 560. In contrast to FIG. 4, the location of both splice index points defining the transitions between the first program segment and the interstitial is available to the DVR system from the splice index record 560 in both normal play mode and rewind mode. As a result, the DVR system is able to render the interstitial in both normal play mode and rewind mode.

When the recorded program is subsequently rendered by the subscriber or other users, the DVR system (e.g., a DVR application-level module residing in a set top terminal or other device that receives and records programs over a broadband network) loads the service number and PIDs of the first program segment into the DVR processing hardware (e.g., the decoders and decryptors located in DVR system 10). This information may be obtained from the index file 530. When the DVR system reaches the splice point in the program (as identified, for example, by the value of the timing offset stored in the splice index record 560) the DVR system compares the service number and PIDs of the interstitial with the service number and PIDs of the first program segment. If the value of any of these parameters has changed (as presumably they will), the DVR hardware will be reprogrammed with the values for the interstitial so that the program may continue to be rendered. If during playback the user rewinds back through the splice point, the DVR system programs the service number and PIDs for the first program segment into the hardware.

Figure 6:
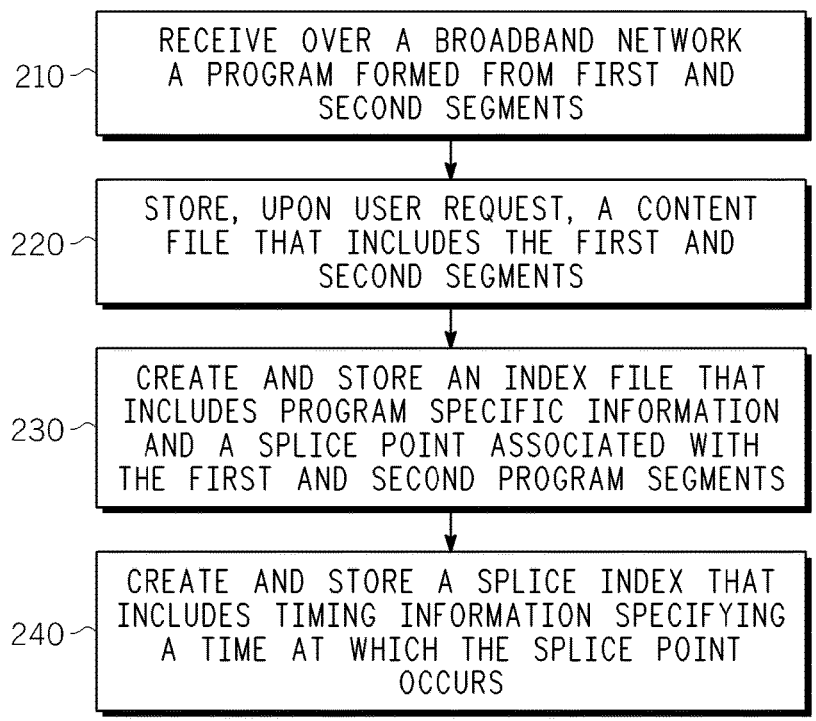
FIG. 6 is a flowchart showing one example of a method for recording a program.

FIG. 6 is a flowchart showing one example of a method for recording a program.

The method begins in step 210 when a program is received over a broadband network. The program includes first and second program segments that are spliced together. The method continues in step 220 when, in response to a user request, at least one content file is stored which includes the first and second program segments. At least one index file is created and stored in step 230. The index file includes program specific information associated with the first and second program segments. The index file includes an identification of a splice point denoting a transition between the first and second program segments. A splice index is created and stored in step 240. The splice index includes timing information specifying a time at which the splice point occurs.

Figure 7:
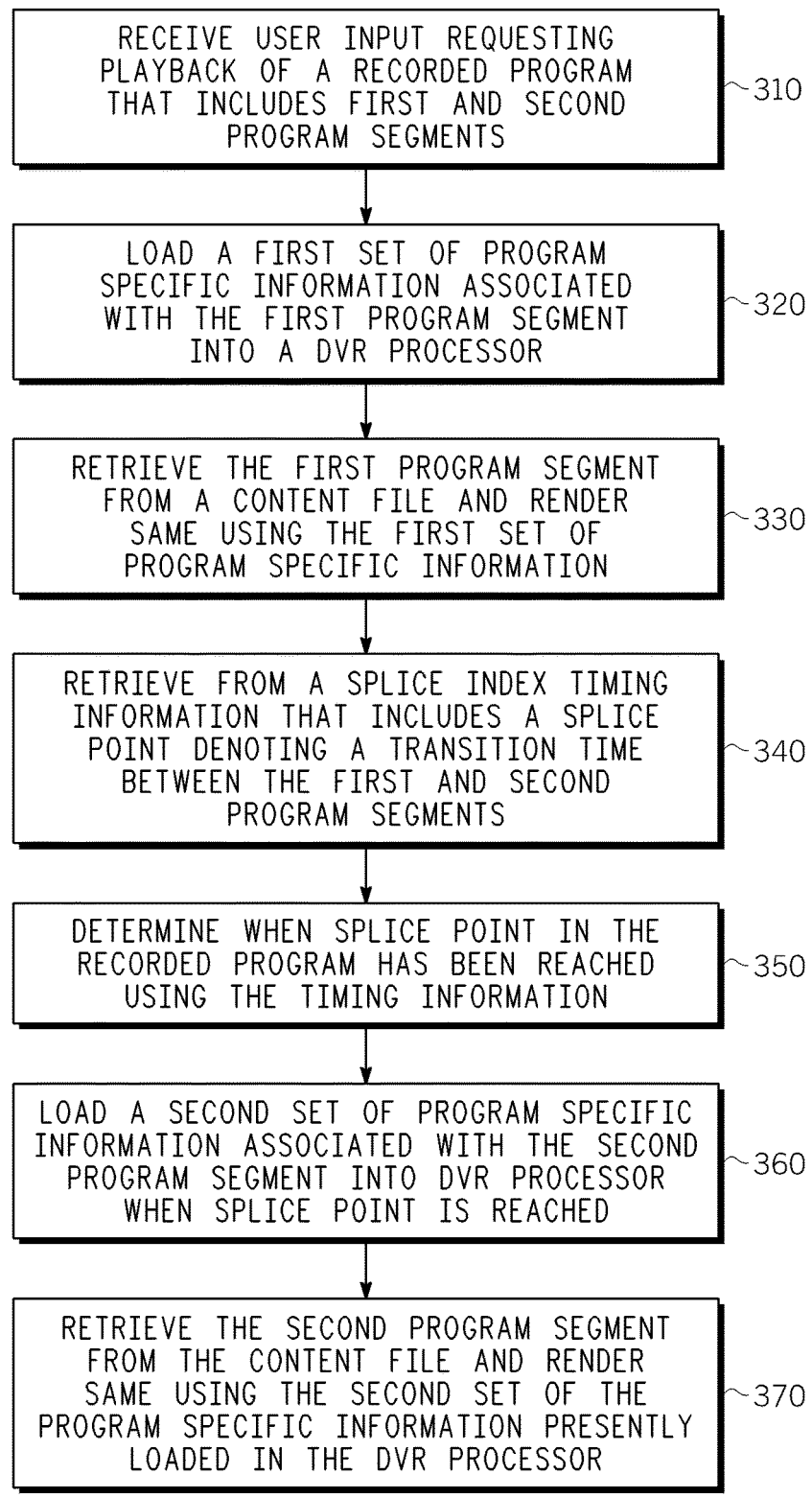

FIG. 7 is a flowchart showing one example of a method for rendering a program that has been recorded on a DVR or the like. The DVR may be a network DVR or a subscriber-based DVR. The method begins in step 310 when user input is received requesting playback of a recorded program that includes first and second program segments that are stored in at least one content file. Next, in step 320, a first set of program specific information associated with the first segment of the recorded program is loaded into a DVR processor such as the DVR decoder. In step 330 the first segment of the recorded program is retrieved from a content file and rendered using the first set of program specific information. Timing information is retrieved from a splice index in step 340. The splice index includes timing information for a splice point that denotes a transition time between the first and second program segments. The timing information is used in step 350 to determine when the splice point in the recorded program being rendered has been reached. Upon reaching the splice point, a second set of program specific information associated with the second segment of the recorded program is loaded into the DVR processor in step 360. In step 370 the second segment of the recorded program is retrieved from the content file and rendered using the second set of the program specific information presently loaded in the DVR processor.

The processes described above, including but not limited to those presented in FIGS. 6 and 7, may be implemented in general, multi-purpose or single purpose processors. Such a processor will execute instructions, either at the assembly, compiled or machine-level, to perform that process. Those instructions can be written by one of ordinary skill in the art following the description of presented above and stored or transmitted on a computer readable medium. The instructions may also be created using source code or any other known computer-aided design tool. A computer readable medium may be any medium capable of carrying those instructions and include a CD-ROM, DVD, magnetic or other optical disc, tape and silicon memory (e.g., removable, non-removable, volatile or non-volatile).

The invention claimed is:

1. A method of recording a program, comprising:
    storing, in response to a user request, at least one content file that includes first and second program segments that are spliced to form a single program, wherein an identification of a splice point is included in an elementary stream associated with at least one of the first and second program segments, the splice point denoting a transition between the first and second program segments;
    in a digital video recorder, creating and storing at least one index file that includes program specific information associated with the first and second program segments, wherein the program specific information includes a program's service number that is used to access a program map table, wherein the program map table includes packet identifiers, the index file further including the identification of the splice point; and
    in the digital video recorder, creating and storing a splice index record that includes timing information specifying a time at which the splice point occurs, wherein the splice index record further includes:
        one or more pre-service acquisition packet identifiers that identify packets of a first program transport stream for receiving the first program segment, and
        a corresponding one or more post-service acquisition packet identifiers that identify packets of a second program transport stream for receiving the second program segment;
    wherein, during a playback of the content file in a trick play mode, the splice index record is available to the digital video recorder, and the splice index record enables the transition between the first and second program segments, such that the digital video recorder does not need to receive the identification of the splice point from one of the first and second program segments during the playback of the content file in the trick play mode.

2. The method of claim 1 further comprising receiving the first and second program segments over a broadband network in the first and second program transport streams, respectively.

3. The method of claim 2 wherein the identification of the splice point is located in a data packet included in the first program transport stream.

4. The method of claim 1 wherein the content file, index file and the splice index record are stored in a network digital video recorder (DVR) associated with a broadband network headend.

5. The method of claim 1 wherein the timing information includes a timing offset to denote a point in time at which the splice point occurred relative to a start time of the first program segment.

6. The method of claim 5 wherein creating and storing the splice index record further comprises:
    using the timing offset to create second timing index values for the second program segment that sequentially follow first timing index values for the first program segment; and
    storing the first and second timing index values for the first and second program segments in the splice index record.

7. The method of claim 1 wherein the splice index record is not included in the content file and is included in a second index file.

8. The method of claim 1 wherein the splice index record further includes at least some of the program specific information for the first and second program segments.

9. The method of claim 1, wherein the one or more pre-service acquisition packet identifiers are selected from a group consisting of:
    a video packet identifier that identifies packets of the first program transport stream for receiving the first program segment,
    an audio packet identifier that identifies packets of the first program transport stream for receiving the first program segment,
    a data packet identifier that identifies packets of the first program transport stream for receiving the first program segment, and
    an entitlement control message packet identifier that identifies packets of the first program transport stream for receiving the first program segment;
    and each of the corresponding one or more post-service acquisition packet identifiers corresponds to a selected pre-service acquisition packet identifier, and identifies packets of the second program transport stream for receiving the second program segment.

10. A set top terminal comprising:
    a receiver/tuner for receiving programs over a broadband network;
    a DVR module for coordinating storage and playback of programs received over the broadband network, wherein the DVR module is configured to store in at least one content file first and second program segments associated with a single program received over the broadband network, wherein an identification of a splice point is included in an elementary stream associated with at least one of the first and second program segments, the splice point denoting a transition between the first and second program segments, and further configured to store in at least one index file program specific information associated with the first and second program segments, wherein the program specific information includes a program's service number that is used to access a program map table, wherein the program map table includes packet identifiers, wherein the DVR module is further configured to store, in a common splice index file, timing information denoting a splice point between the first and second program segments, wherein the splice index file further includes a splice index record comprising:
        one or more pre-service acquisition packet identifiers that identify packets of a first program transport stream for receiving the first program segment, and a corresponding one or more post-service acquisition packet identifiers that identify packets of a second program transport stream for receiving the second program segment;

at least one storage medium for storing the content file, index file, and the splice index file; and a processor operationally associated with the receiver/tuner, the at least one storage medium, and the DVR module;

wherein, during a playback of the content file in a trick play mode, the splice index record is available to the DVR module, and the splice index record enables the transition between the first and second program segments, such that the DVR module does not need to receive the identification of the splice point from one of the first and second program segments during the playback of the content file in the trick play mode.

11. The set top terminal of claim 10 wherein the timing information includes a timing offset to denote a point in time at which the splice point occurred relative to a start time of the first program segment.

12. The set top terminal of claim 11 wherein the DVR module is further configured to use the timing offset to create second timing index values for the second program segment that sequentially follow first timing index values for the first program segment.

13. The set top terminal of claim 10 wherein the DVR module is further configured to:
receive user input requesting rewinding of the single program back through the splice point;
determine from the timing information in the splice index file when the splice point has been reached;
upon reaching the splice point while rewinding the single program, cause values of the program specific information associated with the first program segment to be loaded into the processor from the splice index file; and
cause the first program segment of the single program to be retrieved from the content file and rendered using the program specific information presently loaded in the processor.

14. The set top terminal of claim 10 wherein the DVR module is further configured to:
receive user input that requests that the single program be rendered through the splice point in normal play mode or fast forward mode;
determine from the timing information in the splice index file when the splice point has been reached;
upon reaching the splice point while rendering the single program, cause values of the program specific information associated with the second program segment to be loaded into the processor from the splice index file; and
cause the second program segment of the single program to be retrieved from the content file and rendered using the program specific information presently loaded in the processor.

15. At least one non-transitory computer-readable medium encoded with instructions which, when executed by a processor, perform a method including:
receiving user input requesting playback of a recorded program that includes first and second program segments that are stored in at least one content file, wherein an identification of a splice point is included in an elementary stream associated with at least one of the first and second program segments, the splice point denoting a transition between the first and second program segments;
causing a first set of program specific information associated with the first segment of the recorded program to be loaded into a DVR processor, wherein the program specific information includes a program's service number that is used to access a program map table, wherein the program map table includes packet identifiers;
causing the first segment of the recorded program to be retrieved from a content file and rendered using the first set of program specific information;
retrieving timing information from a splice index record that includes a splice point denoting a transition time between the first and second program segments, wherein the splice index record further includes:
one or more pre-service acquisition packet identifiers that identify packets of a first program transport stream for receiving the first program segment, and
a corresponding one or more post-service acquisition packet identifiers that identify packets of a second program transport stream for receiving the second program segment;
determining from the timing information when the splice point in the recorded program being rendered has been reached, wherein, during a playback of the content file in a trick play mode, the splice index record is available to the DVR processor, and the splice index record enables the transition between the first and second program segments, such that the DVR processor does not need to receive the identification of the splice point from one of the first and second program segments during the playback of the content file in the trick play mode;
upon reaching the splice point, causing a second set of program specific information associated with the second segment of the recorded program to be loaded into the DVR processor; and
causing the second segment of the recorded program to be retrieved from the content file and rendered using the second set of the program specific information presently loaded in the DVR processor.

16. The computer-readable medium of claim 15, the method further comprising:
receiving user input requesting rewinding of the recorded program back through the splice point;
determining from the timing information in the splice index record when the splice point has been reached;
upon reaching the splice point while rewinding the recorded program, causing the values of the first set of program specific information to be loaded into the DVR processor from the splice index record; and
causing the first segment of the recorded program to be retrieved from the content file and rendered using the first set of the program specific information presently loaded in the DVR processor.

17. The computer-readable medium of claim 15 wherein the timing information includes a timing offset to denote a point in time at which the splice point occurred relative to a start time of the first program segment.

18. The computer-readable medium of claim 17, the method further comprising:
using the timing offset to create second timing index values for the second program segment that sequentially follow first timing index values for the first program segment;
storing the first and second timing index values for the first and second program segments in the splice index record.

19. The computer-readable medium of claim 15, the method further comprising:
  receiving user input requesting fast-forwarding of the recorded program while rendering the first program segment;
  determining from the timing information in the splice index record when the splice point has been reached;
  upon reaching the splice point while fast forwarding the recorded program, causing the values of the second set of program specific information to be loaded into the DVR processor from the splice index record; and
  causing the second segment of the recorded program to be retrieved from the content file and rendered using the second set of the program specific information presently loaded in the DVR processor.

20. The computer-readable medium of claim 15 wherein the user input is received by a network DVR over a broadband network.

* * * * *